(12) United States Patent
Nelson et al.

(10) Patent No.: US 6,977,897 B1
(45) Date of Patent: Dec. 20, 2005

(54) SYSTEM AND METHOD FOR JITTER COMPENSATION IN DATA TRANSFERS

(75) Inventors: Michael A. Nelson, Portland, OR (US); Thomas W. Bucht, Hillsboro, OR (US)

(73) Assignee: Crossroads Systems, Inc., Austin, TX (US)

( * ) Notice: Subject to any disclaimer, the term of this patent is extended or adjusted under 35 U.S.C. 154(b) by 836 days.

(21) Appl. No.: 09/695,754

(22) Filed: Oct. 24, 2000

Related U.S. Application Data (60) Provisional application No. 60/202,720, filed on May 8, 2000.

(51) Int. Cl.[7] .......................... H04L 12/42; G06F 13/00
(52) U.S. Cl. ....................... 370/235; 370/258; 375/372; 710/53; 710/56
(58) Field of Search ................................ 370/229, 230, 370/231, 235, 412, 428, 429, 503, 506, 516, 370/254, 258; 375/357, 362, 363, 371, 372; 710/29, 52, 53, 56, 57; 711/154

(56) References Cited

U.S. PATENT DOCUMENTS

| | | | | |
|---|---|---|---|---|
| 4,839,893 A | * | 6/1989 | Smith | 370/506 |
| 4,873,703 A | * | 10/1989 | Crandall et al. | 375/371 |
| 4,977,582 A | | 12/1990 | Nichols et al. | 375/118 |
| 5,084,841 A | * | 1/1992 | Williams et al. | 365/189.07 |
| 5,142,529 A | * | 8/1992 | Parruck et al. | 370/545 |
| 5,331,641 A | | 7/1994 | Parruck et al. | 370/102 |
| 5,563,891 A | * | 10/1996 | Wang | 370/505 |
| 6,055,285 A | * | 4/2000 | Alston | 375/372 |
| 6,289,066 B1 | * | 9/2001 | LaVigne et al. | 375/372 |
| 6,463,069 B1 | * | 10/2002 | Eriksson et al. | 370/428 |
| 6,594,329 B1 | * | 7/2003 | Susnow | 375/372 |
| 6,625,241 B2 | * | 9/2003 | Mejia | 375/372 |

FOREIGN PATENT DOCUMENTS

| | | | | |
|---|---|---|---|---|
| EP | 0 859 311 | | 8/1998 | G06F 5/06 |
| JP | 57136267 | | 8/1982 | G06F 13/04 |

OTHER PUBLICATIONS

Patrick R. Trischitta and Eve L. Varma, Jitter in Digital Transmission Systems, 1989, Artech House Inc. p. 132-136.*
"Fibre Channel Arbitrated Loop (FC-AL) Rev 4.5", Jun. 1, 1995, ANSI, NY, USA.
International Search Report dated May 10, 2002.

* cited by examiner

*Primary Examiner*—Alpus H. Hsu
(74) *Attorney, Agent, or Firm*—Sprinkle IP Law Group (57) ABSTRACT

A system and method for compensating for differences between a recovered receive clock and an internal transmit clock in an elastic buffer and thereby preventing corruption of data. In one embodiment, the system comprises a circularly accessed buffer coupled to read and write logic. The read and write logic read and write to locations within the circular buffer as indicated by respective read and write pointers. The system further comprises control logic which compares the pointers to determine whether the buffer is approaching an underflow or overflow condition and adds or deletes fill words between frames of data to compensate for the underflow or overflow condition. In one embodiment, the system includes fill word logic which is configured to add a fill word bit to each received word and to set or clear the fill word bit to indicate whether or not the corresponding word is a fill word.

26 Claims, 4 Drawing Sheets

SYSTEM AND METHOD FOR JITTER COMPENSATION IN DATA TRANSFERS

This application claims the benefit of the filing date of U.S. Provisional Patent Application Ser. No. 60/202,720 by inventors Michael A. Nelson and Tom Bucht, entitled "System and Method for Jitter Compensation in Data Transfers" filed on May 8, 2000.

FIELD OF THE INVENTION

The invention relates generally to data communication in computer systems, and more particularly to a system and method implemented in connection with serial data packet protocols which re-time received frames to an asynchronous transmit clock wherein overflow or underflow conditions are detected in an elastic buffer and corrected.

BACKGROUND OF THE INVENTION

Individual computer systems can be combined to form networks. There are many different types of networks, including local area networks (LANs,) wide area networks (WANs,) storage area networks (SANs) and many others. Networks are typically characterized by several characteristics, including their protocols, their architectures and their topologies.

Figure 1:
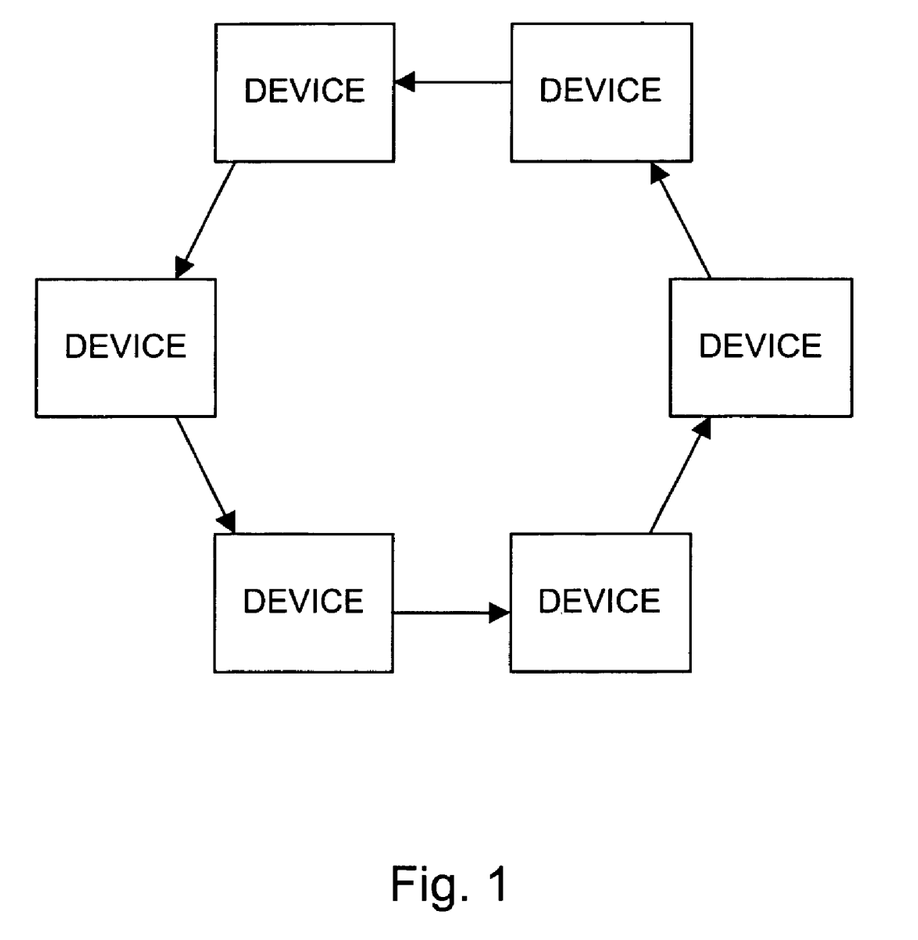
FIG. 1 is a block diagram illustrating a series of devices which are connected in a ring or loop configuration.

One of the network topologies which is commonly used is a ring, or loop. This topology may be implemented, for example, in a Fibre Channel Arbitrated Loop (FC-AL.) FIG. 1 shows a network which implements a loop topology.

In a network having a loop topology, data which needs to be transmitted from one device (e.g., a computer) in the network to another must be passed from the first device to the next device in the loop, which passes the data to the next device, and so on, until the data reaches the destination device. The data is typically formatted into a plurality of frames (or packets of some sort) which carry the payload (the data) and also contain overhead information which, for example, identifies the destination device to which the data is directed. If this device is the destination of the data, the receiving device accepts the data and uses it as needed. If this device is not the destination device, the frame is transmitted to the next device in the network.

The devices in the network typically read the incoming frame data by reconstructing (from the data itself) the clock signal of the device from which the data is received. If it is determined that the data should be passed on to the next device in the loop, the data is typically retransmitted according to a clock signal which is generated within the device which is retransmitting the information. A second clock signal is used to transmit the data because, if the received clock signal were used the amount of jitter added by each node would be cumulative. As a result, the jitter could increase enough to corrupt the data.

Because the recovered receive clock and the transmit clock may have slightly different frequencies, the amount of data received in a given period may not be equal to the amount of data transmitted in that same period. As a result, the buffer in which the received data is stored until it is retransmitted may exceed its capacity (an overflow condition,) or there may not be sufficient data in the buffer to be retransmitted (an underflow condition.) This problem can be compounded each time the frames pass through one of the devices in the loop. Unless there is some means to compensate for this problem, corruption of the data may occur. A mechanism is therefore required to account for the possible differences between the clock signals in the different devices in the network.

One protocol which is used in some networks is the Fibre Channel Arbitrated Loop (FC-AL) protocol. In this protocol, several fill words are transmitted between each of the frames of data. The fill words are simply that—non-useful or redundant words which fill in the space between frames. If the differences in the clock signals cause the frames to be transmitted more slowly than they are received (a potential overflow,) one of the fill words can be deleted from the retransmitted data in order to allow the transmission to "catch up" with the received data. If the frames are retransmitted more quickly than the data is received (a potential underflow,) a fill word can be added between frames to effectively slow down the retransmission and allow the received data to catch up.

SUMMARY

One or more of the problems outlined above may be solved by the various embodiments of the invention which, broadly speaking, comprises a system and method for inserting or deleting fill words between frames of data to compensate for frequency differences between a recovered receive clock and an internal transmit clock.

In one embodiment, the system comprises a circularly accessed buffer coupled to read and write logic. The read and write logic access data words at locations within the circular buffer as indicated by respective read and write pointers. The system further comprises control logic which compares the pointers to determine whether the buffer is approaching an underflow or overflow condition and adds or deletes fill words between frames of data to compensate for the impending underflow or overflow condition. Fill words are added or deleting by manipulating the read or write pointer to re-read or overwrite fill words when necessary. In one embodiment, the system includes fill word logic which is configured to add a fill word bit to each received word and to set or clear the fill word bit to indicate whether or not the corresponding word is a fill word. In one embodiment, the system compares read and write pointers only when one of the pointers has a value of 0 in order to reduce the number of times they are compared and thus to simplify the comparison logic.

In one embodiment, a method comprises writing words to locations in a circular buffer indicated by a write pointer, and reading words out of locations in the buffer indicated by a read pointer. The method further comprises periodically comparing the pointers to identify an approaching overflow or underflow condition and manipulating the read or write pointers in response to the detected overflow or underflow condition. If an approaching overflow condition is detected, the write pointer is manipulated to overwrite a fillword. If an approaching underflow condition is detected, the read pointer is manipulated to re-read a fillword. In one embodiment, the method further comprises adding a fill word bit to each word stored in the buffer to facilitate identification of fill words. In one embodiment, the pointers are compared only when one of the pointers has a value of 0. In one embodiment, the fill words may be deleted with higher priority if the spacing between the read and write pointers exceeds a predetermined maximum threshold.

BRIEF DESCRIPTION OF THE DRAWINGS

Other objects and advantages of the invention may become apparent upon reading the following detailed description and upon reference to the accompanying drawings in which.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION OF THE PREFERRED EMBODIMENT

A preferred embodiment of the invention is described below. It should be noted that this embodiment and other embodiments described below are exemplary and are intended to be illustrative of the invention rather than limiting.

Broadly speaking, the invention comprises a system and method for using pointers to indicate read and write locations in a clocked circular buffer and comparing the pointers to determine whether fill words between frames should be added or deleted to prevent overflow or underflow of data from the buffer. If the write pointer leads the read pointer by more than a predetermined amount (approaching overflow,) the write pointer pauses and overwrites a fillword (effectively deleting a fillword,) allowing the read pointer to catch up to the write pointer. If the write pointer leads the read pointer by less than a predetermined amount (approaching underflow,) the read pointer pauses, re-reading the same fill word (effectively adding another fill word to the transmitted data stream) to allow the write pointer to restore the desired lead.

One embodiment of the present system is implemented in a Fibre Channel network. "Fibre Channel" refers to an data communication technology, as well as a set of standards being developed by the American National Standards Institute (ANSI) to define the technology. Fibre Channel supports both shared media and dedicated, or switched, media. Fibre Channel can be used to provide means for data transfer in many different systems, supporting workstation clusters, switched LANs, SANs (storage area networks) and the like.

Despite its name, "Fibre Channel" technology is not strictly a channel-oriented technology, nor does it represent a network topology. Fibre Channel allows devices to be interconnected in a more generalized scheme. In this scheme, devices may be connected by Fibre Channel links in configurations which include point-to-point configurations, switched fabric configurations and loop configurations. Point-to-point configurations are simply direct connections between two devices. "Switched fabric" configurations use networks formed by one or more interconnected Fibre Channel links and switches. One device in the network can be connected to any of the other devices in the network through the "fabric" formed by the links and switches. Loop configurations, such as Fibre Channel-Arbitrated Loop, or FC-AL, allow data to be communicated between any two of the devices in the network, but the data may have to pass through one or more of the other devices in the network.

Figure 2A:
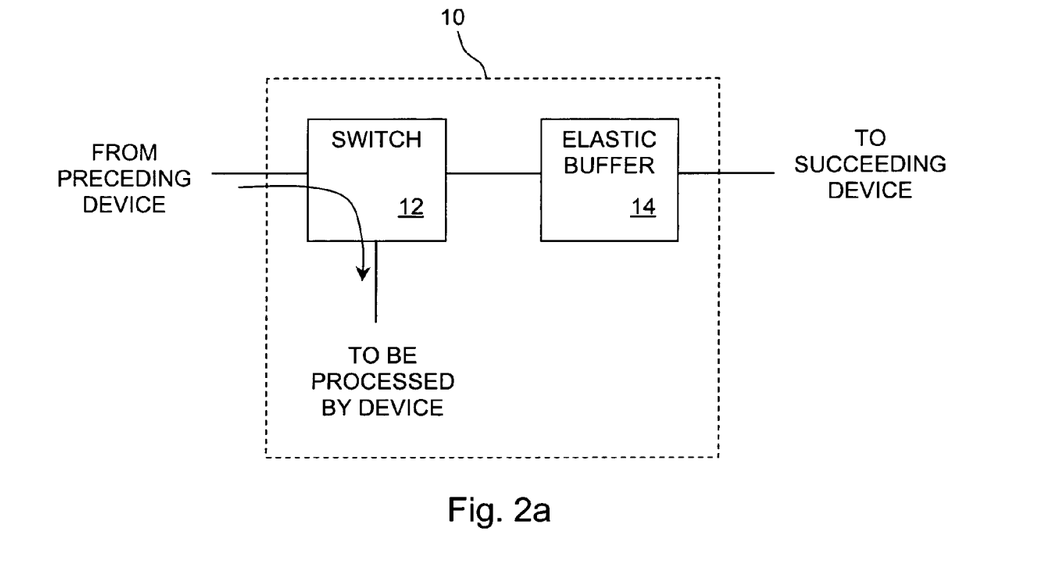
FIGS. 2a and 2b are block diagrams illustrating the routing of data by a device (a) when the device is the destination of the data and (b) when the device is not the destination and passes the data through to a subsequent device.
Figure 2B:
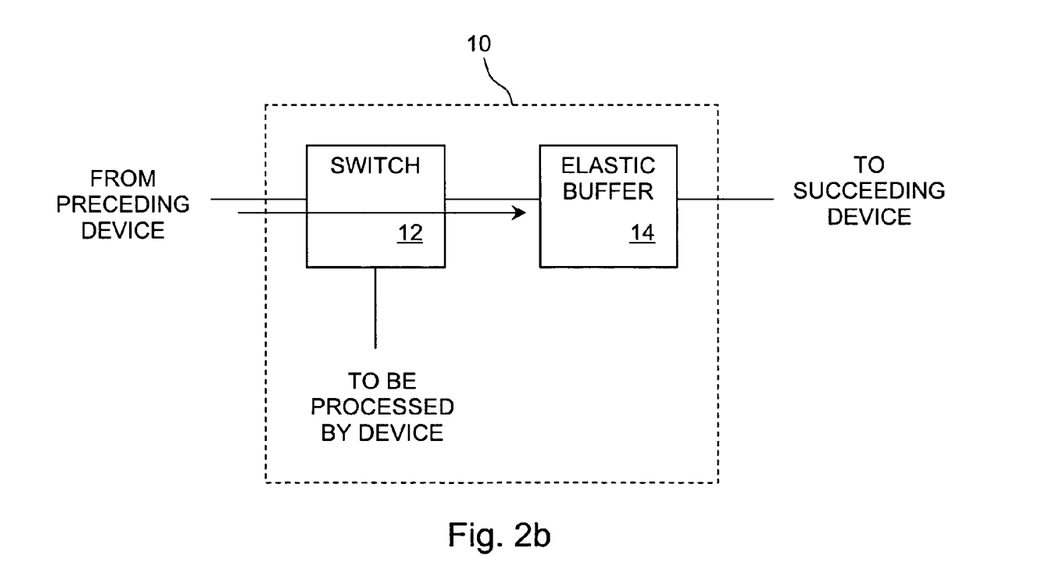

Referring again to FIG. 1, the devices coupled to an FC-AL network are connected in series, with each device being coupled to receive data from a preceding device and to transmit data to a succeeding device. Referring to FIGS. 2a and 2b, each of the devices 10 includes a switch 12 and an elastic buffer 14. Switch 12 is configured to route the frame, whether that frame is destined for corresponding device 10 or a subsequent device in the loop. If the data is destined for current device 10, switch 12 routes the data into the device for processing as shown in FIG. 2a. In this case, the device forwards canned fillwords to the next device in the loop. If the data is not destined for current device 10, but is instead destined for a subsequent device, switch 12 routes the data to pass through the current device as shown in FIG. 2b. If the data is passed through, it is routed to elastic buffer 14, which is configured to transmit it to the next device in the loop.

Figure 3:
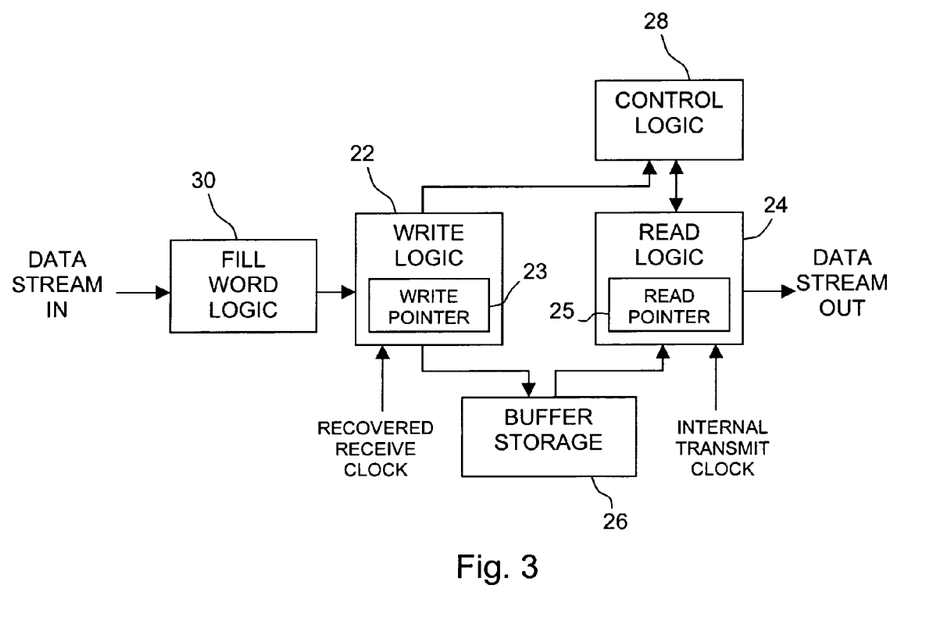
FIG. 3 is a functional block diagram of the elastic buffer and associated logic in one embodiment.

Referring to FIG. 3, a functional block diagram of the elastic buffer and associated logic of one embodiment is shown. In this embodiment, data which is passed through a device is written by write logic 22 to buffer storage 26. Write logic 22 is clocked by the clock signal recovered from the received data. The locations to which the data is written are determined by the value of the associated write pointer 23. Write logic 22 advances write pointer 23 as each storage location is written, so that each successive half-word received from the preceding device in the loop is stored in a successive storage location in the buffer. Buffer storage 26 is configured as a circular buffer. That is, after the write pointer (or read pointer) reaches the last storage location in the buffer, it "wraps around" and points to the first storage location again.

As indicated above, one half-word is written to each storage location in this embodiment. This is a result of using 16-bit wide RAM to store data which, as defined by the Fibre Channel specification, comprises 32-bit words. It should be noted that, in other embodiments, different word lengths and storage locations of different widths may be used, so that each storage location may store full words, portions of words or multiple words. These variations are contemplated to be within the scope of this disclosure. It should be noted that, for the purposes of this disclosure, the term "word" is used to describe a portion of the data which is stored in one of the storage elements of the buffer, and is not limited to words of a particular bit-length.

In one embodiment, buffer storage 26 is implemented using dual port synchronous RAM as storage elements. Each element is 16 bits wide and can store half of a 32-bit Fibre Channel data word. The protocol defined by the Fibre Channel specification also includes a K flag in each word. The present system also includes a fill word flag in each word. This embodiment therefore includes registers to store two additional bits (the fill word bit and the K flag bit) for each of the 16-bit half-words in the RAM storage elements.

Since each storage element only stores a half-word in this embodiment, the fill word bit and K flag bit for each word are stored with the corresponding high half-word.

Read logic 24 reads the data out of buffer storage 26 for transmission to the succeeding device in the loop. Read logic 24 is clocked by an internally generated transmit clock which, although it is intended to operate at the same frequency as the recovered clock signal, is independent of this signal and may therefore vary from it to some extent. Read logic 24 is configured to retrieve the data from the locations indicated by read pointer 25. In operation, read pointer 25 should point to a storage location which differs from the target of the write pointer by an amount which is implementation dependent. The Fibre Channel specification requires that the latency of data which is passed through a device to be a maximum of six word-times. The amount by which the write pointer leads the read pointer adds to the latency, so the spacing of the pointers should be minimized, but should still allow for the addition or deletion of words without corrupting data. In one embodiment, buffer storage 26 has eight storage elements, and the ideal spacing for the pointers is three or four storage locations.

The present system also includes control logic 28, which is coupled to both read logic 24 and write logic 22. Control logic 28 is configured to periodically access read pointer 25 and write pointer 23 to determine the spacing of the storage locations to which they point. If the indicated read and write locations are optimally spaced, the read and write logic proceed without interruption or interference from the control logic. If the indicated read and write locations are too close together (i.e., the write pointer leads the read pointer by less than a predetermined amount,) control logic 28 is configured to cause the read logic to re-read one of the storage locations before continuing and reading the succeeding storage locations. This causes the spacing between the pointers to increase. If, on the other hand, the indicated read and write locations are too far apart (i.e., the write pointer leads the read pointer by more than a predetermined amount,) control logic 28 is configured to cause the write logic to overwrite the same storage location. This causes the spacing between the pointers to decrease.

It should be noted that control logic 28 does not cause read logic 24 to re-read or skip words that contain any of the useful information being transmitted from the source computer to the destination computer. Doing so would corrupt the data. Only fill words, which contain redundant information, are allowed to be skipped or re-read. Thus, fill words are effectively added or deleted between frames when the data is retransmitted by the device.

In the Fibre Channel specification, specific bit sequences are defined as fill words. Fill words are normally detected by scanning each received word and determining which of the words match the sequences defined in the Fibre Channel specification. To facilitate identification of fill words in the present system, this function is performed by fill word logic 30. Fill word logic 30 is positioned upstream from write logic 22 and is configured to add a fill word flag bit to each of the words which is written to buffer storage 26. This bit is set for the fill words and cleared for all other words. After the fill word bit is added to each of the words, fill words can be identified by checking this bit, rather than scanning the entire word to determine whether it matches one of the predefined fill word sequences.

Figure 4A:
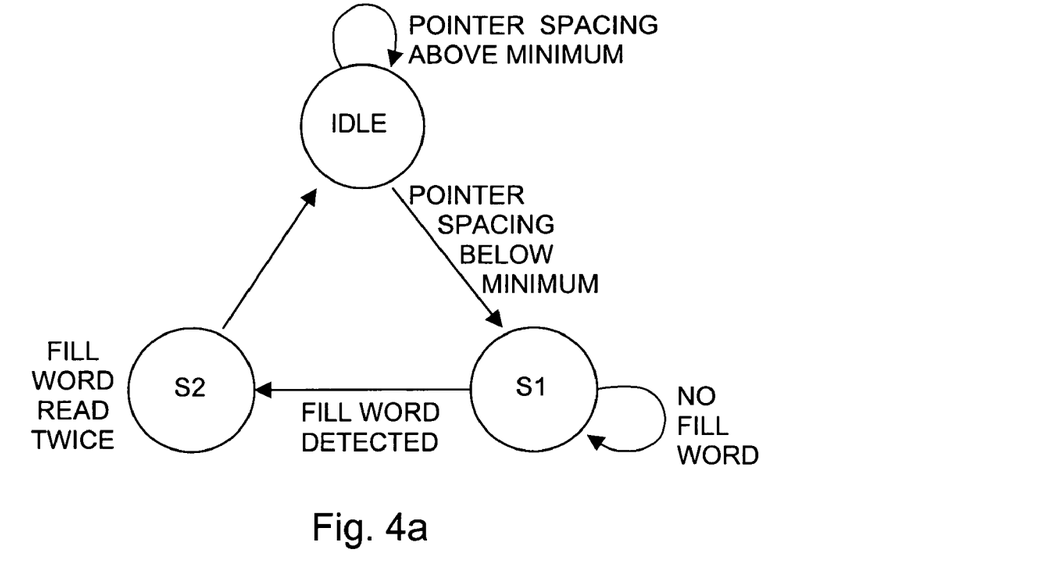
FIGS. 4a and 4b are very simplified state diagrams illustrating the operation of these state machines based upon the spacing of the read and write pointers in one embodiment.
Figure 4B:
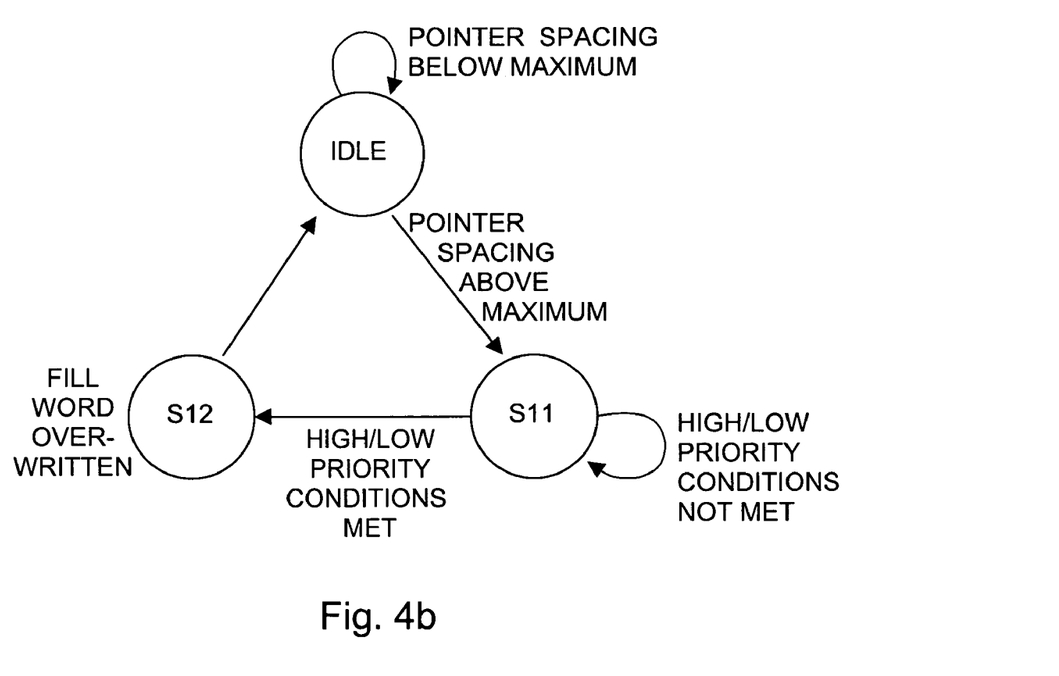

Control logic 28 uses two state machines to control the addition or deletion of fillwords between frames. Referring to FIGS. 4a and b, two state diagrams illustrating the operation of these state machines are shown. In one embodiment, the system is only periodically checked to determine whether the read and write pointers are properly spaced. Because the difference between the recovered receive clock and the internal transmit clock is expected to be minimal, there is no need to check the spacing of the pointers every time the system writes to or reads from one of the storage locations. The timing of the periodic checks is discussed in more detail below.

Before describing the operation of the state machines in control logic 28, it should be noted that the spacing between pointers in this embodiment is determined by subtracting the location of the read pointer from the location of the write pointer. In other embodiments, the spacing can be determined by subtracting the location of the write pointer from the location of the read pointer. When either state machine is considered, one of these cases will involve a comparison of the pointer spacing to a minimum threshold, while the other case will involve a comparison of the pointer spacing to a maximum threshold. For instance, if a circularly accessed buffer has 8 storage elements, and the write pointer should lead the read pointer by no more than 5 storage locations, the spacing determined by subtracting the read pointer from the write pointer is compared to a maximum value of 5. If, on the other hand, the spacing is determined by subtracting the write pointer from the read pointer, the spacing is compared to a minimum value of 3 (8–5).

As noted above, this embodiment determines pointer spacing by subtracting the location of the read pointer from the location of the write pointer. Referring to FIG. 4a, when the spacing between pointers is checked, the addition state machine (i.e., the state machine that controls the addition of fill words) compares the pointer spacing to a predetermined minimum value. If the spacing is greater than the predetermined minimum value, it is not necessary to add a fill word, and the state machine remains in the idle state. If, on the other hand the spacing is less than the predetermined minimum value, a fill word should be added, and the state machine moves to state S1. When the state machine moves to state S1, the system examines the words which are being read from buffer storage 26 by read logic 24. As explained above, only fill words are re-read, so the control logic takes no further action until a fill word is detected. When a fill word is detected, the state machine moves to state S2, and a fill word is added to the stream of transmitted data by reading the fill word twice (the read pointer is not incremented after the first read.)

Referring to FIG. 4b, the operation of the deletion state machine is similar to that of the addition state machine, except that the pointer spacing is compared to a predetermined maximum value, and a fill word is deleted (overwritten) rather than being re-read. The deletion of the fillword occurs according to the high- and low-priority conditions described in more detail below.

In an embodiment using eight storage locations, the write pointer initially leads the read pointer by 3 or 4 storage locations. If the spacing is determined by subtracting the read pointer from the write pointer, there is an initial spacing of four or five storage locations. This spacing is considered to be safe, and no action needs to be taken if this spacing is detected. If the spacing is 0, 1 or 7, the pointers are too far apart and an error is considered to have occurred. If the spacing is 2 or 3, a fill word should be added and, if the spacing is 6, a fillword should be deleted.

It should be noted that, in this embodiment, spacings of 4 or 5 are both quiescent because each storage location stores a half word, while full words are added or deleted. If only one spacing was quiescent, then each time a word was added or deleted, the pointers would end up with spacing that would indicate an opposing action. In other words, every time a word was added, the resulting spacing would indicate that a word should be deleted, and vice versa. Consequently, the system would constantly be adding and deleting words.

In one embodiment, the system may take into account the urgency of the need to add or delete a fill word. It is helpful to consider the use of fill words between frames in a Fibre Channel system. According to the Fibre Channel specification, the number of fill words between frames should be a minimum of 6 when the frames are originated and should always be at least 2 when received. Consequently, the control logic is configured so that, if it has detected the need to delete a fill word, it will count the number of fill words between frames before deleting a fill word. If deleting one of the existing fill words would result in less than 4 fill words between the frames, the control logic may delay the deletion unless it is a high priority action. In other words, if the data may otherwise be corrupted, it may be necessary to immediately delete a fill word. If the deletion is a low priority, however, the control logic may wait until the next series of fill words is detected before deleting a fill word. (In the system described above, where pointer spacing of 2 or 3 storage locations indicate the need to delete a fill word, the spacing of 2 may be a high priority deletion, whereas a spacing of 3 may be a low priority deletion.)

In one embodiment, control logic 28 performs an asynchronous comparison between the read and write pointers and has an error of plus or minus one storage location. Even a slight variation between the receive and transmit clocks can cause this circuit to dither between two values. This may cause the control logic to add a fill word and then almost immediately delete a fill word, or vice versa. This embodiment therefore implements a form of hysteresis by including logic to suppress any addition or deletion of fill words unless the pointer spacing is stable for at least half of a clock cycle.

This embodiment also implements a dead time to the add and delete state machines. Because the read and write pointers are only checked every eighth clock cycle, it takes sometime before the spacing between the pointers can be updated to reflect the results of adding or deleting a word. Consequently, after a fill word is added or deleted, the state machines are disabled for about 15 clock cycles so that incorrect spacing information is not generated.

In order to simplify the calculation of the spacing between the pointers, the spacing is determined when one of the pointers (more specifically, the pointer which is subtracted from the other) is at location 0. (It is assumed here that the storage locations are numbered 0 through n.) When this pointer is at 0, the value of the other pointer is equal to the distance between the pointers. Thus, rather than actually having to calculate the spacing between the pointers, it is only necessary to read the value of one of the pointers. The determination of the pointer spacing when one of the pointers is at 0 also provides a convenient timing mechanism. In other words, the pointer spacing is determined whenever the pointer is set to 0. If there are eight storage locations in the buffer, the spacing is determined every eighth read or every eighth write to the buffer. Because the difference between the transmit and receive clocks is small, the spacing will change very slowly, so checking it only periodically is sufficient.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for buffering data in a device configured to be coupled to other devices in a loop network topology, the method comprising:
   storing a plurality of successive words into storage locations in a circular memory;
   reading the plurality of successive words out of storage locations in the circular memory;
   maintaining a read pointer indicating a read location in the circular memory;
   maintaining a write pointer indicating a write location in the circular memory;
   comparing the read and write pointers to determine a number of storage locations by which the write pointer leads the read pointer;
   reading one of the storage locations twice in response to detecting that the number of storage locations by which the write pointer leads the read pointer is less than a predetermined minimum number; and
   overwriting one of the storage locations in response to detecting that the number of storage locations by which the write pointer leads the read pointer is greater than a predetermined maximum number.

2. The method of claim 1 wherein comparing the read and write pointers to determine a number of storage locations by which the write pointer leads the read pointer is not performed each time one of the storage locations is read.

3. The method of claim 2 wherein comparing the read and write pointers to determine a number of storage locations by which the write pointer leads the read pointer comprises reading the value of one of the read and write pointers when the other of the read and write pointers has a value of 0.

4. The method of claim 1 further comprising
   examining a plurality of words in the storage locations,
   detecting that one of the plurality of words is a fill word, wherein reading one of the storage locations twice comprises reading the storage location containing the fill word twice, and wherein overwriting one of the storage locations comprises examining the plurality of words in the storage locations,
   detecting that one of the plurality of words is a fill word and
   overwriting the storage location containing the fill word.

5. The method of claim 4 further comprising determining which of the plurality of successive words are fill words and for each of the plurality of successive words providing an indication of whether the word is a fill word.

6. The method of claim 5 wherein providing the indication comprises adding a bit to each word, setting the bit if the word is a fill word and clearing the bit if the word is not a fill word.

7. The method of claim 4 further comprising:
   determining whether the number of storage locations by which the write pointer leads the read pointer is greater than a high-priority threshold number which is greater than the predetermined maximum number; and
   if the number of storage locations by which the write pointer leads the read pointer is greater than the predetermined maximum number but less than the high-priority threshold number, deleting one of the fill words with a low priority, and if the number of storage locations by which the write pointer leads the read pointer is greater than the high-priority threshold number, deleting one of fill words with a high priority.

8. The method of claim 4 further comprising:

determining whether the number of storage locations by which the write pointer leads the read pointer is greater than a high-priority threshold number which is greater than the predetermined maximum number; and if the number of storage locations by which the write pointer leads the read pointer is greater than the predetermined maximum number but less than the high-priority threshold number, waiting until a series of more than four consecutive fill words is detected and deleting one of the series of fill words, and if the number of storage locations by which the write pointer leads the read pointer is greater than the high-priority threshold number, waiting until a series of more than two consecutive fill words is detected and deleting one of the series of fill words.

9. The method of claim 1 wherein if the number of storage locations by which the write pointer leads the read pointer is greater than a high error threshold, an error is indicated and if the number of storage locations by which the write pointer leads the read pointer is less than a low error threshold, an error is indicated.

10. The method of claim 1 wherein comparing the read and write pointers to determine a number of storage locations by which the write pointer leads the read pointer comprises determining a value for the number of storage locations by which the write pointer leads the read pointer which is maintained for at least one half of a clock cycle.

11. The method of claim 1 wherein comparing the read and write pointers to determine the number of storage locations by which the write pointer leads the read pointer is delayed for a predetermined period of time after reading or overwriting one of the storage locations in response to detecting the spacing of the read pointer and the write pointer.

12. A method for buffering data in a device configured to be coupled to other devices in a loop network topology, the method comprising:

writing a plurality of successive words into storage locations in a circular memory indicated by a write pointer;

reading the plurality of successive words out of storage locations in the circular memory indicated by a read pointer;

determining a number of storage locations by which the write pointer leads the read pointer;

reading one of the storage locations which contains a fill word two or more consecutive times in response to detecting that the number of storage locations by which the write pointer leads the read pointer is less than a predetermined minimum number; and overwriting one of the storage locations which contains a fill word one or more times in response to detecting that the number of storage locations by which the write pointer leads the read pointer is greater than a predetermined maximum number.

13. A device configured to be installed in a network having a loop topology, the device comprising:

an input port for receiving incoming data from a preceding device in the loop, wherein the incoming data is clocked by an external clock signal;

an output port for transmitting outgoing data to a subsequent device in the loop, wherein the outgoing data is clocked by an internal clock signal;

a circular buffer having a plurality of storage locations, wherein the circular buffer is coupled to the input and output ports and configured to store data in the plurality of storage locations;

write logic coupled to the input port and the circular buffer, wherein the write logic is configured to write received data to storage locations in the circular buffer indicated by a write pointer, wherein the write pointer is advanced after data is written to the indicated storage locations, and wherein data is written to the circular buffer at rate of the external clock signal;

read logic coupled to the output port and the circular buffer, wherein the read logic is configured to read data from the storage locations in the circular buffer indicated by a read pointer and transmit the read data to the output port, wherein the read pointer is advanced after data is read from the indicated storage locations, and wherein data is read from the circular buffer at rate of the internal clock signal; and control logic configured to determine whether the read logic is reading data out of the circular buffer more quickly or more slowly than the write logic is writing data into the circular buffer, wherein if the read logic is reading data out of the circular buffer more quickly or more slowly than the write logic is writing data into the circular buffer, the control logic is configured to modify the position of at least one of the read and write pointers to compensate therefor.

14. The device of claim 13 wherein if the control logic determines that the read logic is reading data out of the circular buffer more quickly than the write logic is writing data into the circular buffer, the control logic is configured to position the read pointer to cause one of the storage locations in the circular buffer to be read two consecutive times.

15. The device of claim 14 wherein the storage location in the circular buffer which is read twice contains a fill word.

16. The device of claim 13 wherein if the control logic determines that the read logic is reading data out of the circular buffer more slowly than the write logic is writing data into the circular buffer, the control logic is configured to position the write pointer to overwrite one of the storage locations in the circular buffer one time.

17. The device of claim 16 wherein the storage location in the circular buffer which is skipped contains a fill word.

18. The device of claim 13 wherein the control logic is configured to determine whether the read logic is reading data out of the circular buffer more quickly or more slowly than the write logic is writing data into the circular buffer by comparing the positions of the read and write pointers.

19. The device of claim 18 wherein if the write pointer leads the read pointer by more than a predetermined maximum amount, the read logic is reading data out of the circular buffer more slowly than the write logic is writing data into the circular buffer and wherein if the write pointer leads the read pointer by less than a predetermined minimum amount, the read logic is reading data out of the circular buffer more quickly than the write logic is writing data into the circular buffer.

20. A buffer system comprising:

a circular buffer configured to store data in a plurality of storage locations, wherein a write position is indicated in the buffer by a write pointer and a read position is indicated in the buffer by a read pointer;

write logic configured to write received data to the storage location indicated by the write pointer;

read logic configured to read data from the storage location indicated by the read pointer; and control logic configured to adjust the read pointer to cause a fill word to be read twice in response to detecting that the write pointer leads the read pointer by less than a predetermined minimum amount and configured to adjust the write pointer to cause a fill word to be deleted in response to detecting that the write pointer leads the read pointer by more than a predetermined maximum amount.

21. The buffer system of claim 20 wherein the control logic is configured to act with a high priority to skip a fill word in response to detecting that the write pointer leads the read pointer by more than a high-priority threshold amount and to act with a low priority to skip a fill word in response to detecting that the write pointer leads the read pointer by more than the predetermined maximum amount, but less than the high-priority threshold amount.

22. The buffer system of claim 20 further comprising fill word logic configured to add a fill word bit to a word before the word is stored in the circular buffer and to set the fill word bit to indicate whether the word is a fill word.

23. The buffer system of claim 20 wherein the control logic is configured to compare the positions of the read and write pointers by subtracting the value of one of the pointers from the value of the other of the pointers.

24. The buffer system of claim 20 wherein the control logic is configured to compare the positions of the read and write pointers when one of the pointers has a value of 0.

25. The buffer system of claim 20 wherein the control logic is configured to determine an amount by which the write pointer leads the read pointer and to adjust the read pointer in response to the amount only if the amount is maintained for at least half of a clock cycle.

26. The buffer system of claim 20 wherein the control logic is configured to delay comparing the positions of the read and write pointers after adjusting one of the read and write pointers in response to the relative positions of the read and write pointers.

* * * * *